United States Patent
Hannig et al.

(10) Patent No.: US 11,065,911 B2
(45) Date of Patent: Jul. 20, 2021

(54) METHOD FOR PRODUCING A DECORATED WALL OR FLOOR PANEL

(71) Applicant: Akzenta Paneele + Profile GMBH, Kaisersesch (DE)

(72) Inventors: Hans-Jürgen Hannig, Bergisch Gladbach (DE); Egon Hoff, Mastershausen (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 0 days.

(21) Appl. No.: 16/341,492

(22) PCT Filed: Oct. 26, 2017

(86) PCT No.: PCT/EP2017/077504
§ 371 (c)(1),
(2) Date: Apr. 12, 2019

(87) PCT Pub. No.: WO2018/078043
PCT Pub. Date: May 3, 2018

(65) Prior Publication Data
US 2019/0241009 A1 Aug. 8, 2019

(30) Foreign Application Priority Data
Oct. 27, 2016 (EP) .................................. 16196043

(51) Int. Cl.
*B44C 5/04* (2006.01)
*B41M 7/00* (2006.01)
(Continued)

(52) U.S. Cl.
CPC ............... *B44C 5/04* (2013.01); *B32B 38/00* (2013.01); *B41M 7/00* (2013.01); *B41M 7/0081* (2013.01); *B44C 3/025* (2013.01); *B44C 5/0461* (2013.01)

(58) Field of Classification Search
CPC .................................. B05D 1/00; B44C 5/04
See application file for complete search history.

(56) References Cited

U.S. PATENT DOCUMENTS

| 4,411,931 A | 10/1983 | Duong |
| 6,096,383 A | 8/2000 | Berg et al. |

(Continued)

FOREIGN PATENT DOCUMENTS

| CL | 43115 | 9/2005 |
| CL | 201400262 | 11/2014 |

(Continued)

OTHER PUBLICATIONS

Office Action regarding Korean Patent Application No. 10-2019-7014856, dated Jun. 10, 2020.

(Continued)

*Primary Examiner* — Dah-Wei D. Yuan
*Assistant Examiner* — Kristen A Dagenais-Englehart
(74) *Attorney, Agent, or Firm* — Harness, Dickey & Pierce, P.L.C.

(57) ABSTRACT

The disclosure relates to a method for producing a decorated wall panel or floor panel comprising the following method steps: a) providing a plate-shaped carrier; b) applying a decoration replicating a decorative pattern onto at least one partial region of the plate-shaped carrier; c) applying a covering layer onto the decoration, wherein the covering layer has a radiation-hardening compound; and d) hardening the covering layer. The covering layer is hardened by using a first radiator and a second radiator, wherein the first radiator emits radiation having a different wave length compared to the radiation of the second radiator, and wherein the first radiator and the second radiator are used in a common hardening step.

12 Claims, 3 Drawing Sheets

(51) Int. Cl.
*B32B 38/00* (2006.01)
*B44C 3/02* (2006.01)

(56) References Cited

U.S. PATENT DOCUMENTS

| | | | | |
|---|---|---|---|---|
| 6,888,147 | B1* | 5/2005 | Hansson | B44C 5/0492 |
| | | | | 250/453.11 |
| 8,011,299 | B2* | 9/2011 | Vosahlo | B41J 11/002 |
| | | | | 101/424.1 |
| 2002/0059762 | A1* | 5/2002 | Takeuchi | B44C 5/04 |
| | | | | 52/311.1 |
| 2004/0009338 | A1* | 1/2004 | Jo | B29C 48/11 |
| | | | | 428/297.4 |
| 2007/0035601 | A1* | 2/2007 | Jang | B41M 5/007 |
| | | | | 347/100 |
| 2009/0305008 | A1 | 12/2009 | Nichols et al. | |
| 2011/0129778 | A1* | 6/2011 | Murata | C07C 391/02 |
| | | | | 430/281.1 |
| 2013/0176370 | A1* | 7/2013 | Loccufier | C09D 11/101 |
| | | | | 347/102 |
| 2014/0349087 | A1* | 11/2014 | Jung | B05D 1/02 |
| | | | | 428/195.1 |
| 2015/0343761 | A1 | 12/2015 | Roeder et al. | |
| 2016/0067949 | A1* | 3/2016 | Peltola | B32B 27/34 |
| | | | | 428/318.6 |
| 2017/0008334 | A1* | 1/2017 | Hoff | B44C 5/043 |
| 2018/0272796 | A1 | 9/2018 | Hannig | |
| 2019/0241009 | A1 | 8/2019 | Hannig et al. | |
| 2019/0367716 | A1 | 12/2019 | Hannig et al. | |

FOREIGN PATENT DOCUMENTS

| | | | |
|---|---|---|---|
| CN | 102119076 | A | 7/2011 |
| DE | 19722339 | A1 | 12/1998 |
| DE | 102013105728 | A1 | 12/2014 |
| DE | 202016101306 | U1 | 4/2016 |
| EP | 1836232 | A1 | 9/2007 |
| EP | 2829415 | A1 | 1/2015 |
| EP | 2942208 | A1 | 11/2015 |
| EP | 3147135 | A1 | 3/2017 |
| JP | 2016508080 | A | 3/2016 |
| UA | 32517 | U | 5/2008 |
| UA | 32585 | U | 5/2008 |
| UA | 49197 | U | 4/2010 |
| WO | WO-2004043667 | A1 | 5/2004 |
| WO | WO-2008122668 | A1 | 10/2008 |
| WO | 2015128255 | A1 | 9/2015 |
| WO | WO-2015128255 | A1 * | 9/2015 ............... B44C 5/06 |
| WO | 2015158649 | A1 | 10/2015 |
| WO | WO-2016091819 | A1 | 6/2016 |

OTHER PUBLICATIONS

Office Action regarding Chilean Application No. 201901137, dated Jun. 17, 2020; 14 pages.

Decision to Grant issued in corresponding Ukrainian Application No. a 2019 05661 by the Ukrainian Patent Office dated Aug. 21, 2020.

Office Action regarding Chinese Patent Application No. 201780066858X, dated Jul. 3, 2020.

* cited by examiner

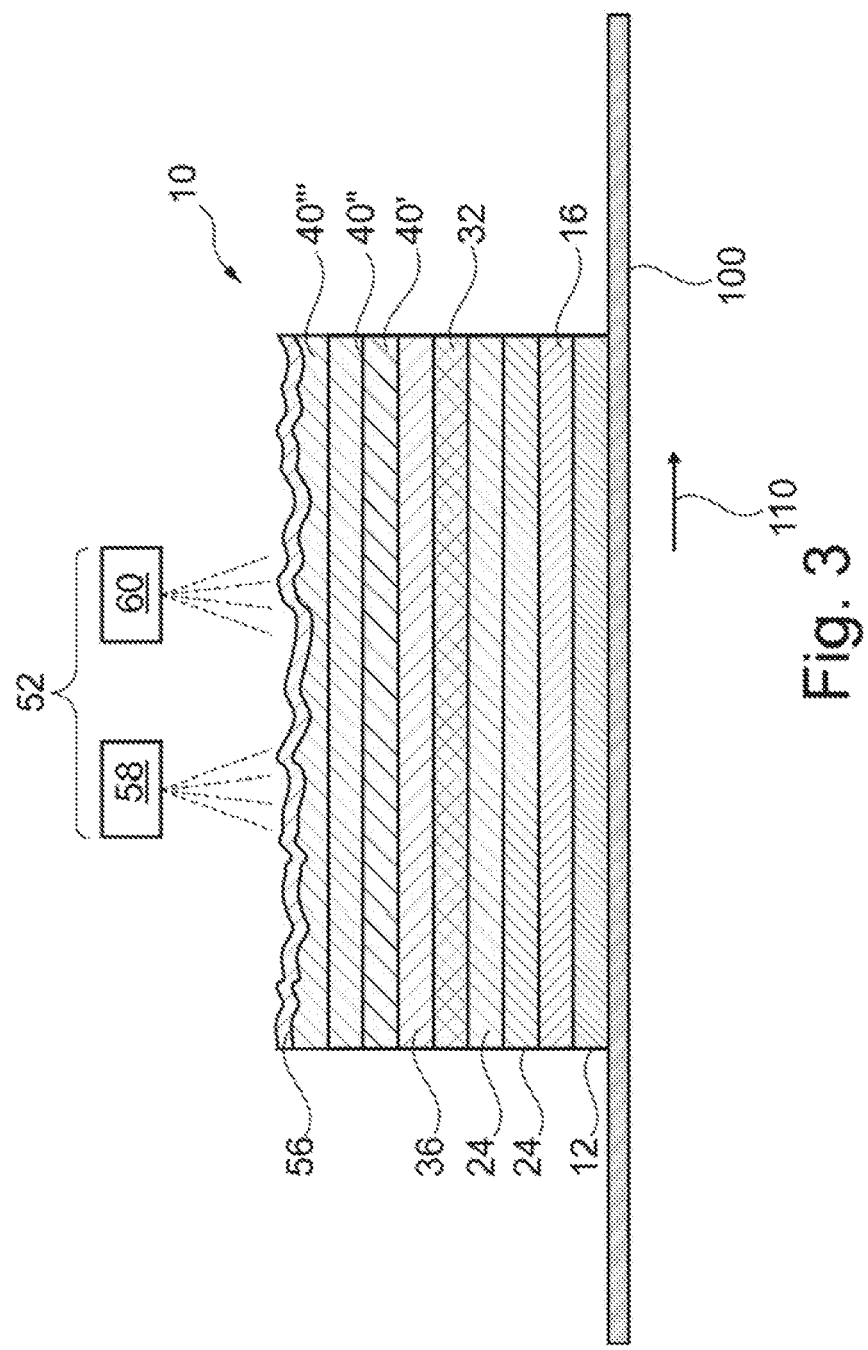

METHOD FOR PRODUCING A DECORATED WALL OR FLOOR PANEL

CROSS-REFERENCE TO RELATED APPLICATIONS

This application is a National Stage of International Application No. PCT/EP2017/077504 filed on Oct. 26, 2017. This application claims the priority to European Patent Application No. 16196043.0, filed on Oct. 27, 2016. The entire disclosures of the above applications are incorporated herein by reference.

FIELD

The present disclosure relates to a method for manufacturing a decorated wall or floor panel.

BACKGROUND

This section provides background information related to the present disclosure which is not necessarily prior art.

Such decorated panels are known per se, wherein the term wall panel also means panels which are suitable as a ceiling lining. They usually consist of a carrier or core of a solid material, such as a wood material, which is provided on at least one side with a decorative layer and a covering layer and optionally with further layers, such as a wearing layer disposed between the decorative and the covering layer. The decorative layer is usually a printed paper impregnated with an aminoplast resin. The covering layer and the remaining layers are usually made of aminoplast resin.

From document U.S. Pat. No. 6,888,147 B1 a method for producing of a panel is known. According to a method known from this document, a decoration is applied onto a core whereupon the decoration is provided with a lacquer layer.

WO 2015/128255 A1 discloses a method for producing a decorative panel. According to this method a lacquer-containing covering layer is partially cured while forming a curing gradient, wherein the curing gradient is provided in the thickness direction of the covering layer. Subsequently, a structuring of the covering layer and a final curing of the covering layer take place. The partial curing and the final curing can be implemented with different wavelengths.

However, in certain fields of application, and in particular if stable and easy to produce panels are required, the methods known from the prior art still offer room for improvements.

SUMMARY

This section provides a general summary of the disclosure, and is not a comprehensive disclosure of its full scope or all of its features.

It is therefore the object of the present disclosure to provide an improved method for producing decorated wall or floor panels.

This object is achieved by a method according to claim 1. Preferred embodiments of the disclosure are described in the dependent claims, in the description or in the figures, wherein further features described or shown in the dependent claims or in the description or in the figures, individually or in any combination, can constitute an object of the disclosure, if the opposite is not clearly obvious from the context.

According to the disclosure, thus, a method for producing a decorated wall or floor panel is proposed, comprising the method steps:
a) providing a plate-shaped carrier,
b) applying a decoration replicating a decorative template onto at least a part of the plate-shaped carrier,
c) applying a covering layer onto the decoration, wherein the covering layer comprises a radiation-curing compound, and
d) curing the covering layer,
wherein the covering layer is cured by use of a first radiator and a second radiator,
wherein the first radiator emits radiation having a different wavelength compared to the radiation of the second radiator, and wherein the first radiator and the second radiator are used in a common curing step.

The method described above offers significant advantages over the prior art solutions.

The method described above thus serves to form a decorated wall or floor panel. In the sense of the disclosure, the term "decorated wall or floor panel" or "decorative panel" is to be understood in particular as wall, ceiling, door or floor panels comprising a decoration applied onto a carrier plate. Decorative panels are used in a variety of ways both in the field of interior design of rooms and for decorative claddings of buildings, for example in exhibition stand construction. One of the most common application fields of decorative panels is their use as a floor covering. Herein, the decorative panels often comprise a decoration intended to replicate a natural material.

Examples of such replicated natural materials are wood species such as maple, oak, birch, cherry, ash, walnut, chestnut, wenge or even exotic woods such as Panga-Panga, mahogany, bamboo and bubinga. In addition, often natural materials such as stone surfaces or ceramic surfaces are replicated.

In this case, the above-described method includes according to method step a) providing a plate-shaped carrier. For the purposes of the present disclosure, a "plate-shaped carrier" can be understood as a natural material, such as a wood-based material, a fiber material or a material comprising a plastic, which is configured in the form of a plate and, in particular may serve as the core or base layer of the panel to be produced. For example, the plate-shaped carrier can already impart a suitable stability to the panel or can contribute thereto. Moreover, the plate-shaped carrier may already define the shape and/or size of the panel to be produced. However, the plate-shaped carrier can also be provided as a large plate. A large plate in the sense of the disclosure is in particular a carrier whose dimensions several times exceed the dimensions of the final decorative panels, and which in the course of the manufacturing process is separated in a corresponding plurality of decorative panels, for example by sawing, laser or water jet cutting.

For example, a carrier can be provided based on a natural material, a plastic or a wood-plastic composite material (WPC). It is also possible to use layer structures of a plurality of the stated materials, for example plasterboard or wood-plastic laminated boards.

For example, the carrier plate may be formed of a thermoplastic, elastomeric or thermosetting plastic. Also plates of minerals such as natural and artificial stone slabs, concrete slabs, gypsum fiber boards, so-called WPC plates (from a mixture of plastic and wood) as well as plates from natural raw materials such as cork and wood can be used according to the disclosure as a carrier. Moreover, plates of biomass as a natural material such as straw, maize straw, bamboo, leaves, algae extracts, hemp or oil palm fibers can be used according to the disclosure. Furthermore, recycled materials of the materials mentioned can be used in conjunction with the method according to the disclosure. Furthermore, the plates may be configured based on the natural material cellulose, such as paper or cardboard.

Wood-based materials in the sense of the disclosure in addition to solid wood materials are also materials such as cross-laminated timber, glue-laminated timber, blockboard, veneered plywood, laminated veneer lumber, parallel strand lumber and bending plywood. In addition, wood-based materials in the sense of the disclosure are also to be understood as chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally cured, for example with cement, chipboards are wood-based materials in the sense of the disclosure. Moreover, cork represents a wood-based material in the sense of the disclosure.

In the sense of the disclosure the term fiber materials means materials such as paper and nonwoven fabrics on the basis of plant, animal, mineral or even synthetic fibers as well as cardboards. Examples of fiber materials on the basis of plant fibers in addition to papers and nonwoven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

Furthermore, the carrier can be a plastic-based carrier, that is to say comprise or consist of a plastic. Examples of thermoplastic materials are polyvinyl chloride, polyolefines (such as polyethylene (PE), polypropylene (PP)), polyamides (PA), polyurethanes (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymerizates thereof. The plastic materials can include common fillers, such as calcium carbonate (chalk), alumina, silica gel, quartz powder, wood flour, talcum. Moreover, they may be colored in a known way. In Particular, it may be provided that the carrier material includes a flame retardant.

In particular, thermoplastics also offer the advantage that the products made from them can be recycled very easily. Moreover, recycled materials from other sources can be used. This results in another possibility to reduce the manufacturing costs.

It may be preferred when the carrier is a plastic-containing carrier comprising a carrier material with a plastic-containing matrix material, in which a solid material in particular with a particle size of less than or equal to 600 µm is embedded. It may furthermore be preferred that the matrix material comprises polypropylene, for example in the form of LDPE, wherein the polypropylene may comprise a mixture of a homopolymer and a copolymer. With respect to the distribution of homopolymer and copolymer it may be preferred that the homopolymer based on the polypropylene is present in an amount of 10 wt.-% to 40 wt.-%, for example in an amount of 20 wt.-% to 30 wt.-%, such as in an amount of 23 wt.-% to 28 wt.-%, and/or that the copolymer based on the polypropylene is present in an amount of 60 wt.-% to 90 wt.-%, for example in an amount of ≥70 wt.-% to ≤80 wt.-%, such as in an amount of ≥72 wt.-% to ≤76% wt.-%, wherein the polypropylene in particular consists of the homopolymer and the copolymer.

The solid material may, for example, be a wood material, such as wood flour, or another material, such as a component of the rice plant, such as the rice spelt, the rice stem and the rice husk, cellulose or a mineral material, such as stone flour, chalk or other inorganic mineral materials. It may be particularly preferred if the solid material is formed from talcum, for example consists thereof. In principle, the solid materials may be in the form of shreds, chips, flour or fibers. With regard to the use of talcum as a solid material it may be advantageous that, in particular in this embodiment, a high stability is enabled. In addition, such a carrier material can allow improved moisture resistance, in particular with a reduced moisture or heat-induced swelling. Talcum is understood in a manner known per se as a magnesium silicate hydrate, which may have, for example, the chemical formula $Mg_3[Si_4O_{10}(OH)_2]$.

In a particularly preferred embodiment it may be advantageous that the solid material is formed of at least 50 wt.-% talcum, based on the solid material, wherein the matrix material is present in an amount, based on the carrier material, from ≥30 wt.-% to ≤70 wt.-%, for example from ≥35 wt.-% to ≤42 wt.-%, and wherein the solid material, based on the carrier material, is present in an amount from ≥30 wt. % to 80≤wt.-%, for example from ≥65 wt.-% to 73≤wt.-%, and wherein the carrier material and the solid material together, based on the carrier material, are present in an amount of ≥95 wt.-%.

In principle, such a carrier can be provided or formed as is well known for decorative panels. For example, the carrier may be provided from a granular source material which is compressed under pressure and temperature to a corresponding plate-shaped carrier, wherein this example is in no means limitative.

Furthermore, the method according to method step b) comprises the application of a decoration which replicates a decorative template onto at least a partial area of the plate-shaped carrier.

In the sense of the present disclosure the term "decorative template" means in particular such an original natural material or at least a surface of such a material which is to be imitated or replicated by the decoration. The application of the decoration can for example be done by applying a printed paper or a non-printed or a partially printed paper, which is subsequently printed. Alternatively, the decoration may be printed directly on the substrate or on a suitable printing subsurface, as described below.

In order to apply a decoration, first of all a decorative subsurface can be applied to at least one partial area of the carrier. For example, first of all a primer, in particular for printing processes, can be applied as a decorative subsurface, for example in a thickness from ≥10 µm to ≤60 µm. As a primer, a liquid radiation-curing mixture based on a urethane or a urethane acrylate can be used, optionally comprising one or more of a photoinitiator, a reactive diluent, a UV stabilizer, a rheology agent such as a thickener, a radical scavenger, a flow control agent, a defoamer or a preservative, pigment and/or a dye.

In addition to the use of a primer it is possible to apply the decoration on a printable decor paper which can be printed with a corresponding decoration, wherein the decor paper may be provided by means of a resin layer previously applied to the carrier as a binding means. Moreover, a resin may be applied as a printing substrate on the paper, wherein the resin may include as a resin component at least one compound selected from the group consisting of melamine resin, formaldehyde resin, urea resin, phenolic resin, epoxy resin, unsaturated polyester resin, diallyl phthalate or mixtures thereof. The primer can preferably be applied in the method according to the disclosure by means of rubber rollers, a pouring machine or by spraying onto the carrier plate. Preferably, the primer is applied in an amount between ≥1 g/m² and ≤100 g/m², preferably between ≥10 g/m² and ≤50 g/m², in particular between ≥20 g/m² and ≤40 g/m². Following the application of the primer onto the carrier surface, an irradiation process is carried out by use of a radiation source of a suitable wavelength.

Alternatively or in addition to the primer, for example onto the primer, moreover, an undercoat may be applied directly onto the carrier or the primer. For a visually particularly high-quality decorative image, for example, a white-colored undercoat can be applied, which may have white pigments. For example, the undercoat can be applied in two layers. It may be particularly preferred that the undercoat is radiation-curable, for example UV-curable. Then, a first layer of undercoat may preferably be cured prior to the application of another layer of the undercoat and/or prior to the printing of the decoration. For example, the undercoat may comprise polyurethane, for example be provided as a polyurethane lacquer, and, for example, be provided with white pigments.

According to a further embodiment of the method, the decoration or the decorative layer can be applied by direct printing. In the sense of the disclosure, the term "direct printing" may refer to the application of a decoration directly onto the carrier of a panel or onto a non-printed fiber material layer applied onto the carrier. In contrast to conventional methods, in which a decorative layer previously printed is applied onto a carrier, in direct printing the printing of the decoration takes place directly in the course of the panel production. Here, various printing techniques, such as flexographic printing, offset printing or screen printing can be used. In particular, digital printing techniques such as, for example, inkjet processes or inkjet printing processes or laser printing processes can be used. The abovementioned printing processes are particularly sophisticated and, in particular, advantageously suitable for a panel production in order to be able to apply a decoration in detail identical to a template. In the sense of the disclosure direct printing also means the application of the decoration by means of printing techniques onto a printable layer previously applied onto the carrier. Such a printable layer may be formed for example by a liquidly applied and then cured primer layer or even a previously applied printable film, paper or nonwoven layer.

In particular, a digital printing process can be suitable for the above-described method, since the three-dimensional decoration data are preferably provided in an electronic form or in a digital form. This may apply, for example, both for data stored in a database and for data determined in-situ by a three-dimensional scanner. Thus, the decoration data provided may immediately be usable in particular by digital printing processes without further intermediate steps, which makes the method in particular in this embodiment applicable with very little effort and cost-efficient. In addition, by using digital printing processes it is possible to carry out each printing operation individually, so that a particularly wide range of applications and at the same time a dynamic adaptation to the desired product is possible.

The decorative layer or the decoration can be formed from a particular radiation-curable paint and/or ink. For example, a UV-curable paint or ink may be used.

It is also possible, if appropriate, first to carry out a pretreatment of the carrier for electrostatic discharge and, if appropriate, a subsequent electrostatic charging prior to the printing operation. This may in particular serve to avoid the occurrence of blurring in the course of the application of the decoration.

According to a further embodiment of the method, the decorative layers or the decoration can each be applied in a thickness in a range from ≥5 µm to ≤10 µm. For example, the decorative layers can each be applied in a thickness in a range of 8 µm. In particular, in this embodiment or with such thicknesses of the individual decorative layers by means of a particularly thin configuration of the decorative layers and thus a highly precise variability of the surface application or the coverage of a layer by the respective applied decorative layer a particularly template identical impression of the decoration or the panel can be achieved.

Subsequently, according to method step c) the application of a covering layer onto the decoration is carried out, wherein the covering layer comprises a radiation-curing compound. A protection or covering layer means in particular a layer, which protects underlying layers from wear and which can also serve to receive a structure. In particular, one or a plurality of covering layers are provided on the decoration in order to protect it. The design of the covering layer or the covering layers is described in detail below.

The covering layer may comprise an acrylate-based lacquer. In particular, the covering layer may comprise one or more acrylates, which in particular may be modified by polyurethane (PU), or acrylate/polyurethane systems can be used. In addition, it can be provided that the covering layer is used as a lacquer, for example as a radiation-curing or at least partially radiation-curing composition, for example based on an epoxy lacquer or a urethane acrylate. In particular, such lacquer systems can form a particularly scratch and impact resistant covering layer which can make the decorative panel to be produced particularly resistant. The present disclosure in particular enables to provide such lacquer systems with a negative structuring, so as to achieve a particularly high-quality structure impression with the advantages of the lacquer layer.

In this case, the covering layer may have, for example, a layer thickness between ≥100 µm and ≤5 µm, preferably between ≥0.5 mm and ≤2.5 µm.

For example, it can be provided that two covering layers are provided, or that the covering layer is configured as two layers. The layers may be made of the same material, in particular lacquer, or of different materials, in particular of different lacquers. In this case, a lower protective layer may have a structure and the upper protective layer may cover the lower protective layer. In this embodiment, it may be provided that the lower layer has a comparatively high viscosity during the application in order to hold structures stable even before curing, and/or that the upper layer has a comparatively low viscosity in order to be able form a uniform termination. Furthermore, it can be provided that the lower layer has a greater thickness than the upper layer. Thus, the lower layer, which can serve as a textured lacquer, can be applied in an application amount from ≥30 g/m² to ≤40 g/m², whereas the upper layer, which can serve as a topcoat, may be applied in an amount of ≥10 g/m² to ≤15 g/m².

It may be provided that the covering layer includes hard materials, such as, for example, titanium nitride, titanium carbide, silicon nitride, silicon carbide, boron carbide, tungsten carbide, tantalum carbide, alumina (corundum), zirconium oxide or mixtures thereof in order to increase the wear resistance of the layer. It may be provided that the hard material is included in an amount between 5 wt.-% and 40 wt.-%, preferably between 15 wt.-% and 25 wt.-% in the wearing layer composition. Preferably the hard material has an average particle diameter between 10 µm and 250 µm, more preferably between 10 µm and 100 µm. As a result, it is advantageously achieved that the covering layer composition forms a stable dispersion and a segregation or precipitation of the hard material in the wearing layer composition can be avoided.

In order to form a corresponding covering layer, it may be provided in one embodiment that the hard material-containing and radiation-curable composition is applied in a concentration between 10 $g/m^2$ and 250 $g/m^2$, preferably between 25 $g/m^2$ and 100 $g/m^2$. In this case, the application can be carried out for example by means of rollers, such as rubber rollers or by means of pouring devices.

Herein, it may be provided that the hard material at the time of application of the covering layer composition is not included in the composition, but is scattered as particles onto the applied covering layer composition and the covering layer is subsequently cured radiation-induced.

In particular, a structure, in particular a surface structure matching with the decoration, can be introduced into the covering layer by introducing pores, which is also referred to as synchronous pores. This can for example be realized by a so-called negative structuring by providing the covering layer with a structure by means of an embossing means, such as an embossing punch or an embossing roller, by pressing the embossing means into the covering layer. For this purpose, the covering layer can first be partially cured, then provided with a structure and then further cured.

In forming the covering layer by use of lacquers the structure may further be introduced by so-called positive structuring, in which the structures are built up by the application of a lacquer layer and in particular by selectively applying the raised regions of the structure. This is often realized by negatively structured embossing means, which can apply the lacquer layer accordingly.

Furthermore, a positive structuring can be carried out by printing a structure, for example by optionally multi-layered printing of a lacquer. Thus, it can be advantageously provided that method step c) is carried out at least partially by a digital printing process. In this embodiment, thus, a structure can be applied in a particularly advantageous manner. By printing a structure, this structure can be applied very precisely and thereby particularly advantageous as a synchronous pore matching with the decoration. For this purpose, for example, three-dimensional decoration data corresponding to the printing of the decoration can be used in order to enable a visual appearance as identical as possible or almost identical with respect to the decoration template. Here, the printing process can be carried out for example by means of an inkjet printer or a laser printer.

It may be advantageous if the structure is not printed directly onto the decoration but at least one, for example two further layers of the covering layer or the protective layer are arranged beneath the structural layer. This layer or layers can be applied in a manner known per se, for example by roller application or the like. Here, it may be possible to cure the individual layers beneath the structure, for example by use of second radiators, as described in detail in conjunction with its embodiments, before the structure is printed. For example, a first layer of an abrasion resistant layer may be applied and cured, and then another abrasion resistant layer can be applied and cured before the structure is printed. The abrasion resistant layers or covering layers can be provided with abrasion resistant particles as described above.

In principle, it may be provided that the covering layer, and therefore individual, several or all layers of the covering layer, is provided with abrasion resistant particles.

Prior to the application of the abrasion resistant layers an undercoat may be applied onto the decoration. For example, a UV-curable undercoat can be applied. As an undercoat, for example, a particular UV-curable lacquer system, such as an acrylate-based lacquer system, can be used.

Here, the printed structure of the covering layer can be cured by a plurality of radiation units, too. Curing with different wavelengths in a curing step may be particularly advantageous, since in this way a particularly fast and effective curing can take place, which in terms of the stability of the printed structure and thus the long-term stability or the abrasion resistance of the panel produced can be advantageous. For example, the structure may be printed by multiple application, wherein each of the layers may be cured prior to the application of a further layer.

In particular, when a structure is printed by use of a lacquer, wherein one or more abrasion resistant layers or covering layers are disposed beneath the printed structure, it may be advantageous to apply a finishing layer onto the printed structure. This layer may in turn be formed by a lacquer, such as an acrylic lacquer which can be applied by conventional methods. This finishing layer can further improve the stability of the layer structure and further improve the appearance of the structure.

In principle, it can be provided that all layers above the decoration are UV-curable and are cured prior to the application of a further layer, in particular by use of a plurality of radiators or a plurality of wavelengths, as described in detail elsewhere. Thus, for all these layers it can be said that they are cured in a curing step, i.e. in a continuous curing step, by use of different wavelengths. In addition, some or all of the layers may comprise abrasion resistant particles.

It is easily and with high precision possible without further steps to produce a surface structure matching with the decorative image. A surface structure matching with the decorative image means that the surface of the decorative panel has a haptically perceptible structure, which in its shape and pattern corresponds to the optic of the applied decoration in order to obtain a reproduction of a natural material as accurate as possible even with respect to the haptic.

In the method described above it is provided that the covering layer is cured by use of a first radiator and a second radiator, wherein the first radiator emits radiation with a different wavelength compared to the radiation of the second radiator, and wherein the first radiator and the second radiator are used in a common curing step. In particular, this method step can offer advantages over the solutions of the prior art.

An embodiment in which the first radiator and the second radiator are used in a common curing step in the context of the present disclosure means in particular that in a curing process, i.e. when the corresponding layer such as the covering layer, for example, is partially cured and/or when the covering layer is finally cured, two radiators with different wavelengths are used. In other words, it may be provided that in one, several or all curing processes the covering layer is cured by use of two radiators with mutually different wavelengths.

For example, this can be achieved by carrying out a curing step by use of a radiation assembly comprising a first radiator and a second radiator, wherein the first radiator and the second radiator are configured to emit radiation with respectively different wavelengths. The radiation assembly is configured in particular to simultaneously irradiate the covering layer by the first radiator and the second radiator at least partially at the same position or at least partially at different, but adjacent positions. Thus, the covering layer is treated by the first radiator and the second radiator in particular without further intermediate steps and thus in a common curing step by a common curing assembly or radiation assembly with two radiators. Hence, this differs significantly from the prior art, in which, for example, first a partially curing process is carried out with a first wavelength and then a structuring process takes place followed by a final curing process.

The fact that the covering layer is cured by use of a first radiator and a second radiator, wherein the first radiator emits radiation with a different wavelength compared to the radiation of the second radiator, and wherein the first radiator and the second radiator are used in a common curing step, the curing behavior of the covering layer can be significantly improved. In detail, such a curing process with at least two different wavelengths in a common curing step enables an improved full curing. As a result, if necessary, the exposure time of the radiation can be shortened, which can optimize process times.

In addition, an improved full curing may impart an increased stability to the covering layer such that damages during transportation or use can be minimized. This may further enable that structures introduced into the covering layer are maintained even under high stress, which can improve the visual impression even after intensive use.

Moreover, it has surprisingly been found that by means of the method described above an improved adhesion of the covering layer to the underlying decoration can be enabled. Again, the stability of the panel can be further improved, which can lead to the aforementioned advantages.

Respective radiations with different wavelengths in particular means a first radiation and a second radiation which have radiation maxima at least one different position. By way of example, patterns of the radiation maxima may be provided which differ completely or at least partly with respect to the position or the wavelength and/or optionally the intensity.

It may be preferred that the first radiator emits radiation with radiation maxima in a wavelength range of greater than or equal to 395 nm to less than or equal to 445 nm. Alternatively or additionally, it can be provided that the second radiator emits radiation with radiation maxima in a wavelength range of greater than or equal to 200 nm to less than or equal to 440 nm. Furthermore, it can be provided that both radiators emit radiation with radiation maxima in a wavelength range of greater than or equal to 200 nm to less than or equal to 445 nm. It has surprisingly been found that in particular the use of one of the two abovementioned radiators, or particularly preferably a combination of the abovementioned radiators, can improve the advantages with regard to the process control and the stability of the product obtained.

Here, as a non-limiting example, it may be provided that the first radiator is a gallium radiator and that the second radiator is a mercury radiator. In particular, a combination of a gallium radiator and a mercury radiator can enable that the abovementioned wavelength ranges are satisfied and thus the advantages with regard to the process control and the stability of the product obtained are realized.

It may be further preferred that the ratio between the radiation intensity of the first radiator and the radiation intensity of the second radiator is greater than or equal to 0.5:1 to less than or equal to 1:0.5. As a result, a substantially uniform radiation intensity of the two radiators can be enabled, which can further improve the curing result. It can preferably be provided that the ratio between the radiation intensity of the first radiator and the radiation intensity of the second radiator is greater than or equal to 0.75:1 to less than or equal to 1:0.75, for example greater than or equal to 0.9:1 to less than or equal to 1:0.9.

Furthermore, it may be preferred that the exposure time, for example at a feed rate of the carrier during the curing process of 25 to 35 m/s is in a period of about one second, so that depending on a fundamentally variable radiation focus, an exposure time of the total radiation onto a position of less than 1 second may be sufficient.

Furthermore, it may be preferred that the first radiator and the second radiator are aligned such that the radiation of the first radiator and the radiation of the second radiator simultaneously impinge at least partially on different positions of the covering layer, such that the covering layer while travelling along the radiators is first treated by the first radiator and in particular immediately thereafter, i.e. without further intermediate steps, is treated by the second radiator. Here, it may be provided that the first radiator and the second radiator are aligned such that the radiation of the first radiator and the radiation of the second radiator at the same time entirely impinge on different positions of the covering layer, or that the first radiator and the second radiator are aligned such that the radiation of the first radiator and the radiation of the second radiator at the same time impinge partially on different positions of the covering layer and partially impinge on an identical position of the covering layer, such as by scattering of the radiation. In this embodiment, therefore, the covering layer can initially be cured by radiation of a first wavelength and in particular immediately thereafter by radiation of a further wavelength. It has surprisingly been found that this embodiment, too, can enable advantages in terms of the curing process. In particular, the treatment with different wavelengths with respect to the respective wavelength can be more specific, which can make the curing process more adaptable with respect to the respective field of application, i.e., for example, with respect to the specific composition of the covering layer.

In particular, in this embodiment it may be provided that the covering layer is initially treated with a radiation with radiation maxima in a wavelength range of greater than or equal to 395 nm to less than or equal to 445 nm and then with radiation with radiation maxima in a wavelength range of greater than or equal to 200 nm to less than or equal to 440 nm. For example, the covering layer is first treated by a gallium radiator and then by a mercury radiator. It has surprisingly been found that in particular in this embodiment, a particularly preferred curing process can take place.

Furthermore, it may be advantageous that the first radiator and the second radiator are aligned in such a way that the radiation of the first radiator and the radiation of the second radiator simultaneously impinge at least partially on an identical position of the covering layer. In this embodiment, it can thus be provided that the covering layer is at least partially treated at the same time by the first radiator and the second radiator or the corresponding radiation of the first radiator and the second radiator. For example, the radiation of the first radiator and of the second radiator impinge entirely at the same time on the same area of the covering layer. In this embodiment, a particular quick curing process may be possible, which can enable short process times and thus a cost-effective production.

The disclosure is explained below with reference to the figures and an exemplary embodiment.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 shows a detailed view of a radiation unit in a further embodiment.

Corresponding reference numerals indicate corresponding parts throughout the several views of the drawings.

DETAILED DESCRIPTION

Figure 1:
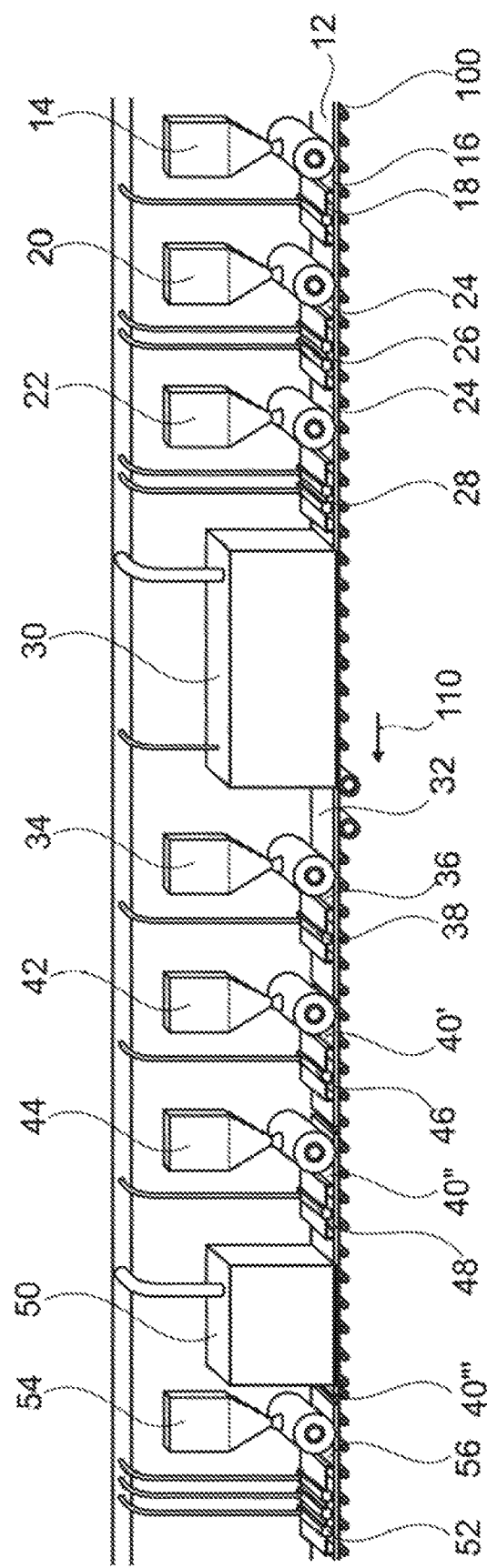
FIG. 1 shows schematically an embodiment of a method for producing a decorated panel.

Example embodiments will now be described more fully with reference to the accompanying drawings.

In this case, a conveying means 100 is shown, on which an intermediate product comprising a carrier 12 is conveyed in the direction of the arrow 110. Here, the carrier 12 can be provided in a manner known per se and can in principle be formed from a suitable material.

It is initially provided that a primer 16 is applied onto the carrier 12 by an application means 14. The primer 16 may be UV-curable and cured by the radiation unit 18. Subsequent to the application of the primer 16, a two-layered white undercoat 24 can be applied by application means 20, 22. The white undercoat 24 may in turn be UV-curable and cured by means of the radiation 26, 28, in particular after the application of each layer.

The primer 16 or white undercoat 24 serves as a printing subsurface. Thus, by use of a digital printing unit 30 a printing of the carrier 12 is carried out in order to form a decoration 32.

Subsequently, an in particular UV-curable undercoat 36 can be applied by a further application unit 34 and cured by the radiation unit 38. The undercoat 36 serves as a subsurface of a covering layer 40. Here, the covering layer 40 may comprise a plurality of individual layers 40', 40" which in particular comprise a radiation-curable lacquer and which can be applied by application means 42, 44 and cured after the application by radiation units 46, 48.

Furthermore, the covering layer 40 comprises a further layer 40" which has a structure in particular in the sense of a synchronous pore. To this end, a further digital printing unit 50 is provided which prints the layer 40" in the sense of a positive structuring in order to produce a defined structure. Subsequently, the layer 40''' can immediately be cured by the radiation unit 52 or a finishing layer 56 can be applied by the application unit 54, followed by curing.

Figure 2:
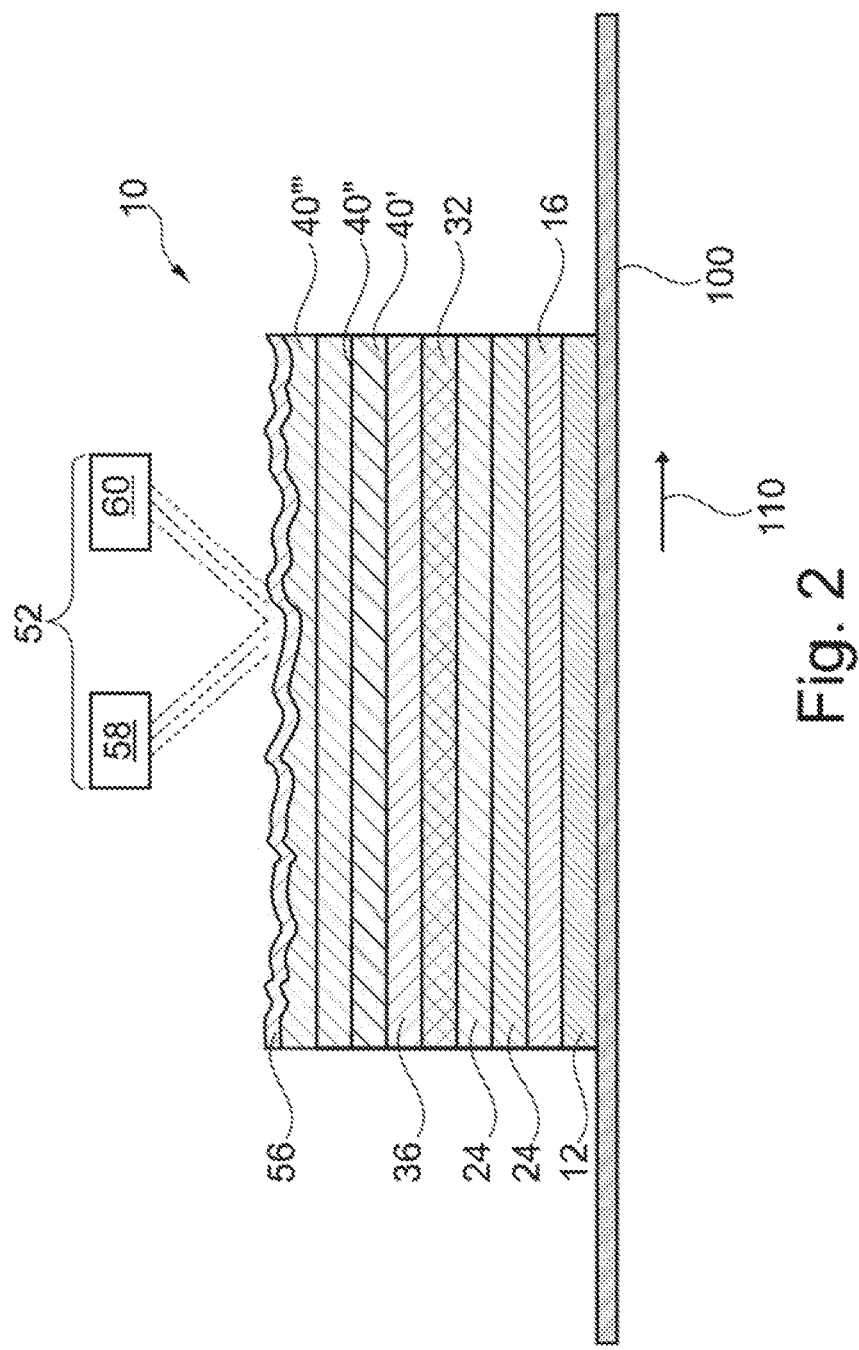
FIG. 2 shows a detailed view of a radiation unit in a first embodiment.

FIGS. 2 and 3 each show an embodiment of the radiation unit 52, wherein the statements made here may apply in principle to any of the described radiation units 16, 26, 28, 38, 46, 48. Particularly preferably, the embodiments shown can serve for the radiation units 18, 26 and 28 in addition to the radiation unit 52.

It can be seen that for curing the covering layer 40, such as the layer 40" which can be regarded as a structural layer, the radiation unit 52 comprises a first radiator 58 and a second radiator 60, wherein it is provided that the first radiator 58 emits radiation with a different wavelength compared to the radiation of the second radiator 60. In particular, the first radiator 58 is a gallium radiator and the second radiator 60 is a mercury radiator. By providing the first radiator 58 and the second radiator 60, a particularly advantageous curing process can be realized. In particular, the respective radiation unit 16, 26, 28, 38, 46, 48, 52 may be provided to cure the corresponding layer to be cured in a curing process with different wavelengths.

According to FIG. 2 it is provided that the first radiator 58 and the second radiator 60 are aligned such that the radiation of the first radiator 58 and the radiation of the second radiator 60 impinge at the same time at least partially on an identical position of the covering layer 40.

FIG. 3 shows a preferred embodiment according to which the first radiator 58 and the second radiator 60 are aligned such that the radiation of the first radiator 58 and the radiation of the second radiator 60 impinge at least partially on different but adjacent, i.e. in particular positions next to each other, of the covering layer 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for producing a decorated wall or floor panel, comprising the steps:

a) providing a plate-shaped carrier;

b) applying a decoration replicating a decorative template onto at least a part of the plate-shaped carrier;

c) applying a covering layer onto the decoration, wherein the covering layer comprises a radiation-curable compound;

wherein the covering layer is cured by use of a first radiator and a second radiator, wherein the first radiator emits radiation having a different wavelength compared to the radiation of the second radiator, and wherein the first radiator and the second radiator, and wherein the first radiator and the second radiator are used in a common curing step, the first radiator emits radiation with radiation maxima in a wavelength range of greater than 400 nm to less than or equal to 445 nm and wherein the first radiator and the second radiator are aligned such that the radiation of the first radiator impinges an area of the covering layer and the radiator of the second radiator impinges the same area at the same time, wherein the ratios between the radiation intensity of the first radiator and the radiation intensity of the second radiator is greater than or equal to 0.75:1 to less than or equal to 1:0.75, wherein no further covering layer is applied after the step of curing the covering layer.

2. The method according to claim 1, wherein the second radiator emits radiation with radiation maxima in a wavelength range of greater than or equal to 200 nm to less than or equal to 440 nm.

3. The method according to claim 1, wherein the first radiator is a gallium radiator and the second radiator is a mercury radiator.

4. The method according to claim 1, wherein the covering layer is treated in step d) first by a gallium radiator and then by a mercury radiator.

5. The method according to claim 1, wherein a radiation-curable lacquer is applied as the covering layer.

6. The method according to claim 5, wherein the radiation-curable lacquer is an acrylic lacquer.

7. The method according to claim 1, wherein the covering layer is provided with abrasion-resistant particles.

8. The method according to claim 1, wherein step c) is carried out at least partially by a digital printing process.

9. The method according to claim 1, wherein step b) is carried out by a digital printing process.

10. The method according to claim 1, wherein the carrier comprises a matrix material and a solid material distributed in the matrix material, wherein the solid material is formed by talcum in an amount of least 50 wt. %, based on the solid material, wherein the matrix material is present in an amount, based on the carrier material, from ≥30 wt. % to ≥70 wt. %, and wherein the solid material, based on the carrier material, is present in an amount from ≥30 wt. % to ≥70 wt. %, and wherein the carrier material and the solid material, based on the carrier material, are present together in an amount of ≥95 wt. %.

11. The method according to claim 10, wherein the matrix material comprises polypropylene, wherein the polypropylene is a mixture of a homopolymer and a copolymer.

12. A method for producing a decorated wall or floor panel, comprising the steps:

a) providing a plate-shaped carrier;

b) applying a decoration replicating a decorative template onto at least a part of the plate-shaped carrier;

c) applying a covering layer onto the decoration, wherein the covering layer comprises a radiation-curable compound; and d) curing the covering layer;

wherein the covering layer is cured by use of a first radiator and a second radiator, wherein the first radiator emits radiation having a different wavelength compared to the radiation of the second radiator, and wherein the first radiator and the second radiator are used in a common curing step, the first radiator emits radiation with radiation maxima in a wavelength range of greater than 400 nm to less than or equal to 445 nm and wherein the first radiator and the second radiator are aligned such that the radiation of the first radiator and the radiation of the second radiator impinge at the same time at least partially on different positions of the covering layer, wherein the ratio between the radiation intensity of the first radiator and the radiation intensity of the second radiator is greater than or equal to 0.75:1 to less than or equal to 1:0.75, wherein no further covering layer is applied after the step of curing the covering layer.

* * * * *